(12) United States Patent
Auerbach et al.

(10) Patent No.: US 12,012,202 B2
(45) Date of Patent: *Jun. 18, 2024

(54) SYSTEM AND METHOD FOR THE PRIORITIZATION OF FLIGHT CONTROLS IN AN ELECTRIC AIRCRAFT

(71) Applicant: BETA AIR, LLC, South Burlington, VT (US)

(72) Inventors: Joshua E. Auerbach, Waterbury Center, VT (US); Nicholas Moy, South Burlington, VT (US); Collin Freiheit, Burlington, VT (US)

(73) Assignee: Beta Air, LLC, South Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,478

(22) Filed: Feb. 27, 2023

(65) Prior Publication Data

US 2023/0219682 A1  Jul. 13, 2023

Related U.S. Application Data

(63) Continuation of application No. 17/524,901, filed on Nov. 12, 2021, now Pat. No. 11,623,738.

(51) Int. Cl.
*B64C 13/16* (2006.01)
*B64C 13/24* (2006.01)
*B64D 27/24* (2006.01)

(52) U.S. Cl.
CPC .............. *B64C 13/16* (2013.01); *B64C 13/24* (2013.01); *B64D 27/24* (2013.01)

(58) Field of Classification Search
CPC ..... B64C 13/16; B64C 13/24; B64C 29/0025; B64C 39/04; B64D 27/24; B64D 2045/0085; B64D 45/00; Y02T 50/60
See application file for complete search history.

(56) References Cited

U.S. PATENT DOCUMENTS 9,499,277 B2   11/2016   Chantriaux et al.
9,828,107 B1   11/2017   Ruymgaart et al.
(Continued)

OTHER PUBLICATIONS

Sadhu et al., On-board Deep-learning-based Unmanned Aerial Vehicle Fault Cause Detection and Identification, May 6, 2020.
(Continued)

*Primary Examiner* — Donald J Wallace
*Assistant Examiner* — Jalal C Coduroglu
(74) *Attorney, Agent, or Firm* — Lee & Hayes, P.C.

(57) ABSTRACT

A system for the prioritization of flight controls in an electric aircraft is illustrated. The system includes a plurality of flight components, a sensor, and a computing device. The plurality of flight components are coupled to the electric aircraft. The sensor is coupled to each flight component of the plurality of flight components. Each sensor of the plurality of sensors is configured to detect a failure event of a flight component of the plurality of flight components and generate a failure datum associated to the flight component of the plurality of flight components. The computing device is communicatively connected to the sensor and is configured to receive the failure datum associated to the flight component of the plurality of flight component from the sensor, determine a prioritization element as a function of the failure datum, and restrict at least a flight element as a function of the prioritization element.

20 Claims, 7 Drawing Sheets

(56) References Cited

U.S. PATENT DOCUMENTS

| | | | |
|---|---|---|---|
| 10,921,826 | B2 | 2/2021 | Groden et al. |
| 10,983,534 | B2* | 4/2021 | English ............... B64C 13/0421 |
| 2002/0138184 | A1* | 9/2002 | Kipersztok ........ G05B 23/0278 |
| | | | 701/32.9 |
| 2003/0050745 | A1* | 3/2003 | Orton ................ B64D 45/0015 |
| | | | 701/3 |
| 2008/0144488 | A1* | 6/2008 | Tuulos ................ H04L 41/0681 |
| | | | 370/216 |
| 2008/0288135 | A1* | 11/2008 | Katrak .................. H04L 9/3297 |
| | | | 701/31.4 |
| 2009/0313569 | A1* | 12/2009 | Gibson ................... G06F 9/451 |
| | | | 715/771 |
| 2012/0109461 | A1* | 5/2012 | Nitta ...................... B62D 6/003 |
| | | | 701/41 |
| 2012/0109464 | A1* | 5/2012 | Mizutani ............. B60W 10/184 |
| | | | 701/1 |
| 2016/0059958 | A1 | 3/2016 | Kvitnevskiy |
| 2017/0285631 | A1* | 10/2017 | Bethke ................. G05D 1/0016 |
| 2018/0237148 | A1* | 8/2018 | Hehn .................... B64C 39/024 |
| 2019/0337634 | A1* | 11/2019 | Geiger ................ G05D 1/0833 |
| 2020/0150217 | A1* | 5/2020 | Choi ................... G05D 1/0676 |
| 2021/0041895 | A1* | 2/2021 | Kashawlic ........... G05D 1/0816 |
| 2021/0109547 | A1 | 4/2021 | Clark |

OTHER PUBLICATIONS

Lee, Fault Detection of Aircraft System with Random Forest Algorithm and Similarity Measure, Dec. 31, 2014.
Mathew Brian Cover, Cognitive-Model-Driven Pilot Attention for Commercial Airline Scenarios, Dec. 31, 2018.

* cited by examiner

SYSTEM AND METHOD FOR THE PRIORITIZATION OF FLIGHT CONTROLS IN AN ELECTRIC AIRCRAFT

CROSS-REFERENCE TO RELATED APPLICATIONS

This application is a continuation of Non-provisional application Ser. No. 17/524,901 filed on Nov. 12, 2021, and titled "SYSTEM AND METHOD FOR THE PRIORITIZATION OF FLIGHT CONTROLS IN AN ELECTRIC AIRCRAFT," which is incorporated by reference herein in its entirety.

FIELD OF THE INVENTION

The present invention generally relates to the field of electric aircrafts. In particular, the present invention is directed to prioritization of flight controls in an electric aircraft.

BACKGROUND

During flight, components of the aircraft that may be essential for a safe and smooth flight may fail. Having a system to monitor these components and to rank them depending on their tendency to perform a failure event may save the aircraft and its workers from catastrophic damage.

SUMMARY OF THE DISCLOSURE

In an aspect, a system for prioritization of flight controls in an electric aircraft is illustrated. The system includes a plurality of flight components, a sensor, and a computing device. The plurality of flight components are coupled to the electric aircraft. The sensor is coupled to each flight component of the plurality of flight components. Each sensor of the plurality of sensors is configured to detect a failure event of a flight component of the plurality of flight components and generate a failure datum associated to the flight component of the plurality of flight components. The computing device is communicatively connected to the sensor and is configured to receive the failure datum associated to the flight component of the plurality of flight component from the sensor, determine a prioritization element as a function of the failure datum, and restrict at least a flight element as a function of the prioritization element.

In another aspect, a method for the prioritization of flight controls in an electric aircraft is also illustrated. The method includes coupling a plurality of flight components to the electric aircraft, coupling a sensor to each flight component of the plurality of flight components, detecting, at the sensor, a failure event of a flight component of the plurality of flight components, generating, at the sensor, a failure datum associated to the flight component of the plurality of flight components, communicatively connecting a computing device to the sensor, receiving, at the computing device, the failure datum associated to the flight component of the plurality of flight component from the sensor, determining, at the computing device, a prioritization element as a function of the failure datum, and restricting, at the computing device, at least a flight element as a function of the prioritization element.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to an aircraft with a monitoring system. In an embodiment, this disclosure includes an aircraft configured to include a fuselage and a plurality of flight components attached to the fuselage. Aspects of the present disclosure include battery submodules connected to a power bus element to provide charge to them depending on a health metric. Aspects of the present disclosure include at least a computing device to receive the health metric and decide whether the battery submodule needs to be charged. Exemplary embodiments illustrating aspects of the present disclosure are described below in the context of several specific examples.

Figure 1:
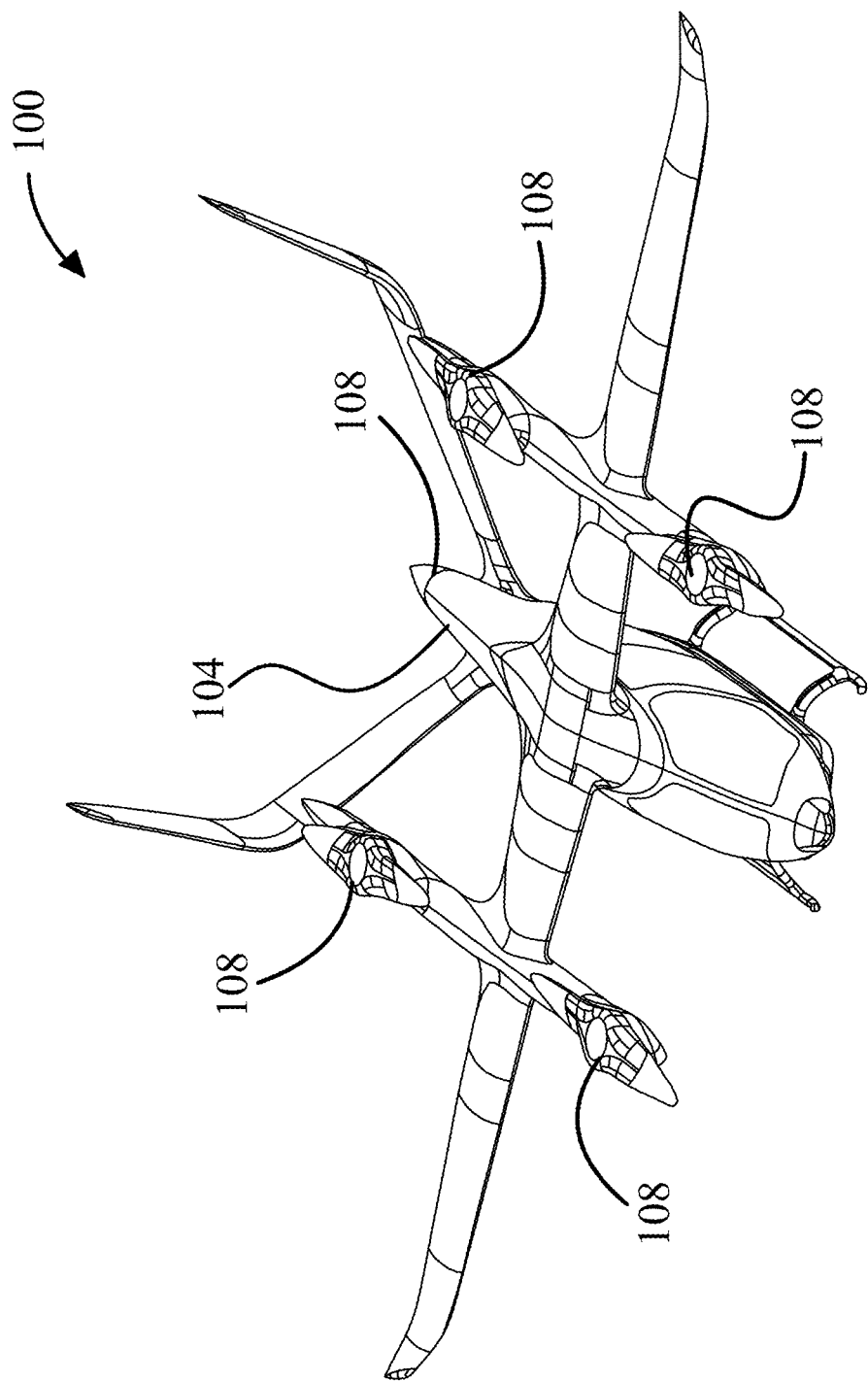
FIG. 1 is a diagrammatic representation of an exemplary embodiment of an electric aircraft.

Referring now to FIG. 1, an exemplary embodiment of an aircraft 100 is illustrated. In an embodiment, aircraft 100 is an electric aircraft. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Aircraft 100 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/603,225, filed on Dec. 4, 2019, and entitled "AN INTEGRATED ELECTRIC PROPULSION ASSEMBLY," the entirety of which is incorporated herein by reference.

Still referring to FIG. 1, aircraft 100, may include a fuselage 104, and a flight component 108 (or one or more flight components 108).

As used in this disclosure, a vertical take-off and landing (VTOL) aircraft is an aircraft that can hover, take off, and land vertically. An eVTOL, as used in this disclosure, is an electrically powered aircraft typically using an energy source, of a plurality of energy sources to power aircraft. To optimize the power and energy necessary to propel aircraft 100, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad-copter," multi-rotor helicopter, or other vehicle that maintains its lift primarily using downward thrusting propulsors. "Fixed-wing flight", as described herein, is where the aircraft is capable of flight using wings and/or foils that generate lift caused by the aircraft's forward airspeed and the shape of the wings and/or foils, such as airplane-style flight.

Still referring to FIG. 1, as used in this disclosure a "fuselage" is a main body of an aircraft, or in other words, the entirety of the aircraft except for a cockpit, nose, wings, empennage, nacelles, any and all control surfaces, and generally contains an aircraft's payload. Fuselage 104 may include structural elements that physically support a shape and structure of an aircraft. Structural elements may take a plurality of forms, alone or in combination with other types. Structural elements may vary depending on a construction type of aircraft such as without limitation a fuselage 104. Fuselage 104 may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later herein.

In embodiments, and with continued reference to FIG. 1, aircraft fuselage 104 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 104 orthogonal to a longitudinal (nose to tail) axis of the aircraft and may form a general shape of fuselage 104. A former may include differing cross-sectional shapes at differing locations along fuselage 104, as the former is the structural element that informs the overall shape of a fuselage 104 curvature. In embodiments, aircraft skin may be anchored to formers and strings such that the outer mold line of a volume encapsulated by formers and stringers comprises the same shape as aircraft 100 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be attached to underlying stringers and formers and may interact with a fluid, such as air, to generate lift and perform maneuvers.

In an embodiment, and still referring to FIG. 1, fuselage 104 may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, and further referring to FIG. 1, fuselage 104 may include a semi-monocoque construction. Semi-monocoque construction, as used herein, is a partial monocoque construction, wherein a monocoque construction is describe above detail. In semi-monocoque construction, aircraft fuselage 104 may derive some structural support from stressed aircraft skin and some structural support from underlying frame structure made of structural elements. Formers or station frames can be seen running transverse to the long axis of fuselage 104 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 1, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 1, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 104. Monocoque comprises only structural skin, and in that sense, aircraft skin undergoes stress by applied aerodynamic fluids imparted by the fluid. Stress as used in continuum mechanics may be described in pound-force per square inch (lbf/in$^2$) or Pascals (Pa). In semi-monocoque construction stressed skin may bear part of aerodynamic loads and additionally may impart force on an underlying structure of stringers and formers.

Still referring to FIG. 1, it should be noted that an illustrative embodiment is presented only, and this disclosure in no way limits the form or construction method of a system and method for loading payload into an eVTOL aircraft. In embodiments, fuselage 104 may be configurable based on the needs of the eVTOL per specific mission or objective. The general arrangement of components, structural elements, and hardware associated with storing and/or moving a payload may be added or removed from fuselage 104 as needed, whether it is stowed manually, automatedly, or removed by personnel altogether. Fuselage 104 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 104 may also be configurable to accept certain specific cargo containers, or a receptable that can, in turn, accept certain cargo containers.

Still referring to FIG. 1, aircraft 100 may include a plurality of laterally extending elements attached to fuselage 104. As used in this disclosure a "laterally extending element" is an element that projects essentially horizontally from fuselage, including an outrigger, a spar, and/or a fixed wing that extends from fuselage. Wings may be structures which may include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may comprise differing and/or similar cross-sectional geometries over its cord length or the length from wing tip to where wing meets aircraft's body. One or more wings may be symmetrical about aircraft's longitudinal plane, which comprises the longitudinal or roll axis reaching down the center of aircraft through the nose and empennage, and plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 1, aircraft 100 may include a flight component 108 or more than one. As used in this disclosure a "flight component" is a component that promotes flight and guidance of an aircraft. In an embodiment, flight component 108 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling may include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 1, flight components 108 may include at least a lift propulsor. As used in this disclosure a "propulsor" is a component and/or device used to propel a craft upward by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment propulsor may include a rotating power-driven hub, to which are attached several radial airfoil-section blades such that the whole assembly rotates about a longitudinal axis. The lift propulsor is further described herein with reference to FIG. 2.

In an embodiment, and still referring to FIG. 1, flight components 108 may include one or more power sources. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. In an embodiment, power source may include an inverter. As used in this disclosure an "inverter" is a device that changes one or more currents of a system. For example, and without limitation, inverter may include one or more electronic devices that change direct current to alternating current. As a further non-limiting example, inverter may include receiving a first input voltage and outputting a second voltage, wherein the second voltage is different from the first voltage. In an embodiment, and without limitation, inverter may output a waveform, wherein a waveform may comprise a square wave, sine wave, modified sine wave, near sine wave, and the like thereof.

Still referring to FIG. 1, power source may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which aircraft 100 may be incorporated.

In an embodiment, and still referring to FIG. 1, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 1, an energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source.

Still referring to FIG. 1, flight components 108 may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Additionally, or alternatively, pusher flight component may include a plurality of pusher flight components. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1145 N to force aircraft to in a horizontal direction along the longitudinal axis. As a further non-limiting example, pusher component may twist and/or rotate to pull air behind it and, at the same time, push aircraft 100 forward with an equal amount of force. In an embodiment, and without limitation, the more air forced behind aircraft, the greater the thrust force with which aircraft 100 is pushed horizontally will be. In another embodiment, and without limitation, forward thrust may force aircraft 100 through the medium of relative air. Additionally or alternatively, plurality of flight components 108 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Figure 2:
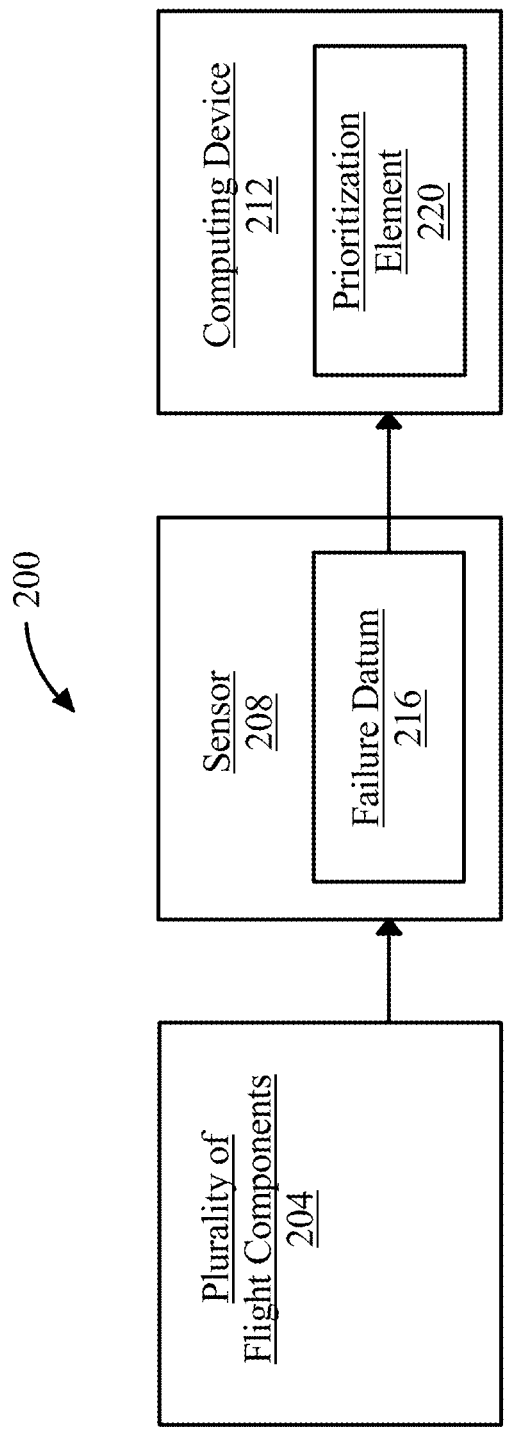
FIG. 2 is a block diagram of an exemplary embodiment of a system for the prioritization of flight controls in an electric aircraft.

Now referring to FIG. 2, system 200 illustrates a block diagram of an exemplary embodiment for the prioritization of flight controls in an electric aircraft. System 200 includes plurality of flight components 204, sensor 208, computing device 212, failure datum 216, and prioritization element 220. In this disclosure, "prioritization" is the process of determining the relative importance or urgency of each flight component of the plurality of flight components 204.

Still referring to FIG. 2, system 200 includes a plurality of flight components 204 coupled to aircraft 100. Plurality of flight components further comprises a propulsor attached to each flight components of the plurality of flight components. Each flight component of the plurality of flight components may also include a propeller, a motor, rotor, a rotating element, an aileron, a rudder, and the like thereof. Plurality of flight components may be any flight component a described herein with reference to FIG. 1.

Referring still to FIG. 2, system 200 includes a sensor 208 coupled to each flight component of plurality of flight components 204. As used in this disclosure a "sensor" is a device, module, and/or subsystem, utilizing any hardware, software, and/or any combination thereof to detect events and/or changes in the instant environment and transmit the information; transmission may include transmission of any wired or wireless electronic signal. Sensor 208 may be attached, mechanically coupled, and/or communicatively coupled, as described above, to aircraft 100. The sensor may include a gyroscope, accelerometer, magnetometers, inertial measurement unit (IMU), pressure sensor, proximity sensor, displacement sensor, force sensor, vibration sensor, and the like. For example, and without limitation, sensor 208 may also include a potentiometric sensor, inductive sensor, capacitive sensor, piezoelectric sensor, strain gauge sensor, variable reluctance sensor, and the like thereof. Sensor 208 may include one or more environmental sensors, which may function to sense parameters of the environment surrounding aircraft 100. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 208 may include a geospatial sensor. Sensor 208 may be located inside aircraft; and/or be included in and/or attached to at least a portion of aircraft 100. Sensor 208 may include one or more proximity sensors, displacement sensors, vibration sensors, and the like thereof. Sensor 208 may be used to monitor the status of aircraft for both critical and non-critical functions. Sensor 208 may be incorporated into vehicle or aircraft or be remote. Sensor 208 may be communicatively connected to an energy source and/or motor, wherein an energy source and motor are described in detail below, in reference to FIG. 1, and wherein sensor senses one or more conditions of the energy source and/or motor.

Still referring to FIG. 2, at least sensor 208 may further include a sensor suite, the sensor suite including a plurality of individual sensors. At least a sensor 208 may further include circuitry or electronic components configured to digitize, transform, or otherwise manipulate electrical signals. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. At least a sensor may include, but not limited to, a pressure sensor, proximity sensor, light sensor, pitot tubes, air speed sensors, and the like. At least a sensor 208 may include a field camera. "Field camera," for the purposes of this disclosure, is an optical device or combination of optical devices, configured to capture a field of vision as an electrical signa, to form a digital image. Field camera may include a single camera and/or two or more cameras used to capture field of vision. In a non-limiting embodiment, two or more cameras may capture two or more perspectives for use in stereoscopic and/or three-dimensional display or remote device, as described below. Field camera may capture a feed including a plurality of frames, such as without limitation a video feed.

With continued reference to FIG. 2, at least sensor 208 may include at least a motion sensor. At least a motion sensor may include, without limitation, a microelectromechanical system (MEMS) sensor. "Motion sensor", for the purposes of this disclosure, is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, and the like. At least a motion sensor may include, without limitation, an inertial measurement unit (IMU). At least a motion sensor may include one or more accelerometers; one or more accelerometers may include a plurality of accelerometers, such as three or more accelerometers positioned to span three dimensions of possible acceleration, so that any direction and magnitude of acceleration in three dimensions may be detected and measured in three dimensions. At least a motion sensor may include one or more gyroscopes; one or more gyroscopes may include a plurality of gyroscopes, such as three or more gyroscopes positioned to span three dimensions of possible acceleration, so that any direction and magnitude of change in angular position in three dimensions may be detected and measured in three dimensions. At least a motion sensor may include, without limitation magnetic sensors such as Hall effect sensors, compasses such as solid-state compasses, or the like. Persons skilled in the art, upon reviewing the entirety of this disclosure, will be aware of various components and/or devices that may be used as at least a motion sensor consistently with this disclosure.

With continued reference to FIG. 2, at least sensor 208 may include a three-dimensional (3D) scanner. 4D scanner may include the use of 4D laser scanning. 4D Laser Scanning is a non-contact, non-destructive technology that digitally captures the shape of physical objects using a line of laser light. 4D laser scanners create "point clouds" of data from the surface of an object. In other words, 4D laser scanning is a way to capture a physical object's exact size and shape into the computer world as a digital 4-dimensional representation. 4D laser scanners measure fine details and capture free-form shapes to quickly generate highly accurate point clouds. 4D laser scanning is ideally suited to the measurement and inspection of contoured surfaces and complex geometries which require massive amounts of data for their accurate description and where doing this is impractical with the use of traditional measurement methods or a touch probe. In a non-limiting embodiment, a 4D scanner may capture a potential landing zone and generate a 4D model of a plot representing the landing zone for analysis described later in the disclosure.

Still referring to FIG. 2, sensor 208 is configured to detect a failure event of a flight component of plurality of flight components 204. In this disclosure, a "failure event" is any event that degrades an ability of one or more flight components to accomplish one or more flight elements. Also in this disclosure, a "flight element" is an element of flight such as an intended yaw, heave, roll, pitch, and the like thereof. Failure event may also include an element of data identifying a failure of a flight component and/or aircraft has occurred, wherein a flight component is described below in detail in reference to FIG. 1. In an embodiment and without limitation, failure event may include rotation degradation. As used in this disclosure "rotation degradation" is a reduced function such that a loss of control in the yaw axis occurs. As a non-limiting example, rotation degradation may occur due to a rotor in a quadrotor configuration that is not operating at the capacity necessary to maintain flight plan, wherein the yaw portion of the torque exerted by the remaining rotors is not eliminated and an uncontrollable yaw axis torque is exerted. In a further embodiment and without limitation, failure event may include a propulsor that is not generating enough torque to maintain the flight plan.

Still referring to FIG. 2, sensor 208 is configured to generate a failure datum 216 associated to flight component of plurality of flight components 204. As used in this disclosure, "failure datum" is an element of data identifying and/or describing the failure event of the flight component. Failure datum 216 may also be an element of data describing the failure of the downward directed propulsor that has occurred. As a non-limiting example, failure datum 216 may be generated as a function of the determination that a propulsor, such as a rotor, is not generating torque, and/or that propulsor and/or rotor is generating less torque than expected and/or necessary to produce a level of thrust required to maintain airspeed and/or lift. As a further example, a degree of torque may be sensed, without limitation, utilizing load sensors deployed at and/or around a propulsor and/or by measuring back electromotive force (back EMF) generated by a motor driving the propulsor. Additionally or alternatively, failure datum 216 may be generated as a function of the determination that one or more power sources is losing capacity to provide sufficient power to downward directed propulsor; this may be determined based on any suitable measure of an energy source capacity and/or output. For instance and without limitation, this may be detected by detection that one or more other downward directed propulsors are consuming less power is being provided to one or more components.

Still referring to FIG. 2, failure datum 216 may be generated as a function of determining a failure event description. As used in this disclosure a "failure event description" is a description of the failure event that identifies a plurality of downward directed propulsors associated with a failure event. As a non-limiting example, failure event description may include identifying a rotor, propulsor, energy source, and the like thereof as a function of a failure event associated with reduced output. Failure datum 216 may be generated as a function of the determination that plurality of downward directed propulsors such as systems for directional control, wherein systems for directional control include systems that enable an aircraft to maintain a heading, direct itself in a direction as indicated by a flight plan, and/or modify direction to perform one or more flight maneuvers as described above, is unable to function correctly. For instance, where steering is directed using rudders and/or ailerons, failure datum 216 may be generated as a function of the one or more rudders and/or ailerons are failing to move as required to effect seering commands; detection may include, without limitation, detection that servomotors or other motors controlling motion of such components, are not functioning, using back EMF, unexpectedly high and/or low amounts of impedance, measures of torque, and/or power and/or current consumption or the like, as above for motors propelling one or more propulsors. Detection may include detection of motion and/or lack thereof of a component such as an aileron and/or rudder using sensor that can detect motion. Detection of directional control failure, whether regulated by ailerons, rudders, and/or differential use of propulsors, may include a determination that expected shear stresses on the aircraft and/or one or more components thereof, as detected using load sensors, are less than they would be if the components were functioning correctly. Alternatively or additionally, detection may include detection that the aircraft is deviating from a route that would be expected if the steering components were functioning correctly.

Still referring to FIG. 2, failure datum 216 may be generated as a function of the determination that one or more power sources is losing capacity to provide sufficient power to downward directed propulsor; this may be determined based on any suitable measure of an energy source capacity and/or output. For instance, and without limitation, an output voltage of the energy source may reduce and/or collapse below a threshold level, a current output may reduce below a threshold level, and/or a detected internal resistance may increase unexpectedly. This may alternatively or additionally be detected by detection that one or more other downward directed propulsors are consuming less power and/or producing less thrust, torque, force, or the like, which may indicate that less power is being provided to one or more components. Sensor is further configured to generate a failure datum 216 of the flight component of an aircraft as a function of the failure event. Failure datum 216 may include, as an example and without limitation, a determination that a propulsor is damaged or otherwise operating insufficiently, such as without limitation a determination that a propulsor such as a propeller is not generating torque, and/or that the propulsor and/or propeller is generating less torque than expected and/or necessary to produce a level of thrust required to maintain airspeed and/or lift. As a further example a degree of torque may be sensed, without limitation, using load sensors deployed at and/or around a propulsor and/or by measuring back electromotive force (back EMF) generated by a motor driving the propulsor.

Referring still to FIG. 2, system 200 includes a computing device 212 communicatively connected to sensor 208. In this disclosure, a "computing device" is any electronic equipment controlled by a CPU and may include a computer, tablet, smartphone, or the like. Computing device could include but is not limited to a flight controller, simulation device, and the like. As used in this disclosure a "flight controller" is a computing device of a plurality of computing devices dedicated to data storage, security, distribution of traffic for load balancing, and flight instruction. Computing device 112 may include and/or communicate with any other computing device as described in this disclosure, including without limitation a microcontroller, microprocessor, digital signal processor (DSP) and/or system on a chip (SoC) as described in this disclosure. Further, computing device 112 may include a single computing device operating independently, or may include two or more computing device operating in concert, in parallel, sequentially or the like; two or more computing devices may be included together in a single computing device or in two or more computing devices. In embodiments, computing device 112 may be installed in an aircraft, may control the aircraft remotely, and/or may include an element installed in the aircraft and a remote element in communication therewith. In an embodiment, and without limitation, computing device 112 may be configured to command a plurality of flight components, wherein flight components are described in reference to FIG. 1. Flight controller is described herein more detail in reference to FIG. 3. Computing device 212 is configured to receive failure datum 216 associated to flight component of plurality of flight components 204 from sensor 208. The flight controller may include any computing device and/or combination of computing devices programmed to operate the aircraft.

Still referring to FIG. 2, computing device 212 is configured to determine a prioritization element 220 as a function of failure datum 216. In this disclosure, "prioritization element" is the element of the aircraft that needs the most attention due to its failure datum. The prioritization element may include ranking one or more flight elements. For example, ranking may be performed as a function of a ranking-machine-learning process such as logistic regression and/or naive Bayes ranking algorithm, nearest neighbor algorithm such as k-nearest neighbors, support vector machines, least squares support vector machines, fisher's linear discriminant, quadratic classifiers, decision trees, boosted trees, random forest classifiers, learning vector quantization, and/or neural network-based algorithms. Ranking also may be done by a specific priority, such as pitch being the highest priority, then lose roll, then lose heave, then lose yaw. When power fails, this is the degradation of controls. Training data in the machine-learning process includes failure datum; the machine-learning process could use the training data and/or train a model which is used to perform the ranking, according to any machine-learning algorithm described below. When enacting this restriction, the process that might be followed is any prioritization process mentioned in U.S. Nonprovisional application Ser. No. 17/218,428, filed on Mar. 31, 2021, and entitled "METHODS AND SYSTEMS FOR FLIGHT CONTROL CONFIGURED FOR USE IN AN ELECTRIC AIRCRAFT," the entirety of which is incorporated herein by reference. Machine learning process is further described herein with reference to FIG. 4.

Still referring to FIG. 2, computing device 212 is configured restrict at least a flight element as a function of prioritization element 220. In an embodiment, and without limitation, a flight element may denote one or more torques, thrusts, airspeed velocities, forces, altitudes, groundspeed velocities, directions during flight, directions facing, forces, orientations, and the like thereof. Restriction involves limiting a pilots capability to control a flight element. For example, the flight controller may restrict a pilot's capability to maneuver a yaw control, heave control, roll control, pitch control, and the like thereof, wherein restricting may include preventing and/or eliminating the pilot's capability and/or mitigating the pilot's capability.

Figure 3:
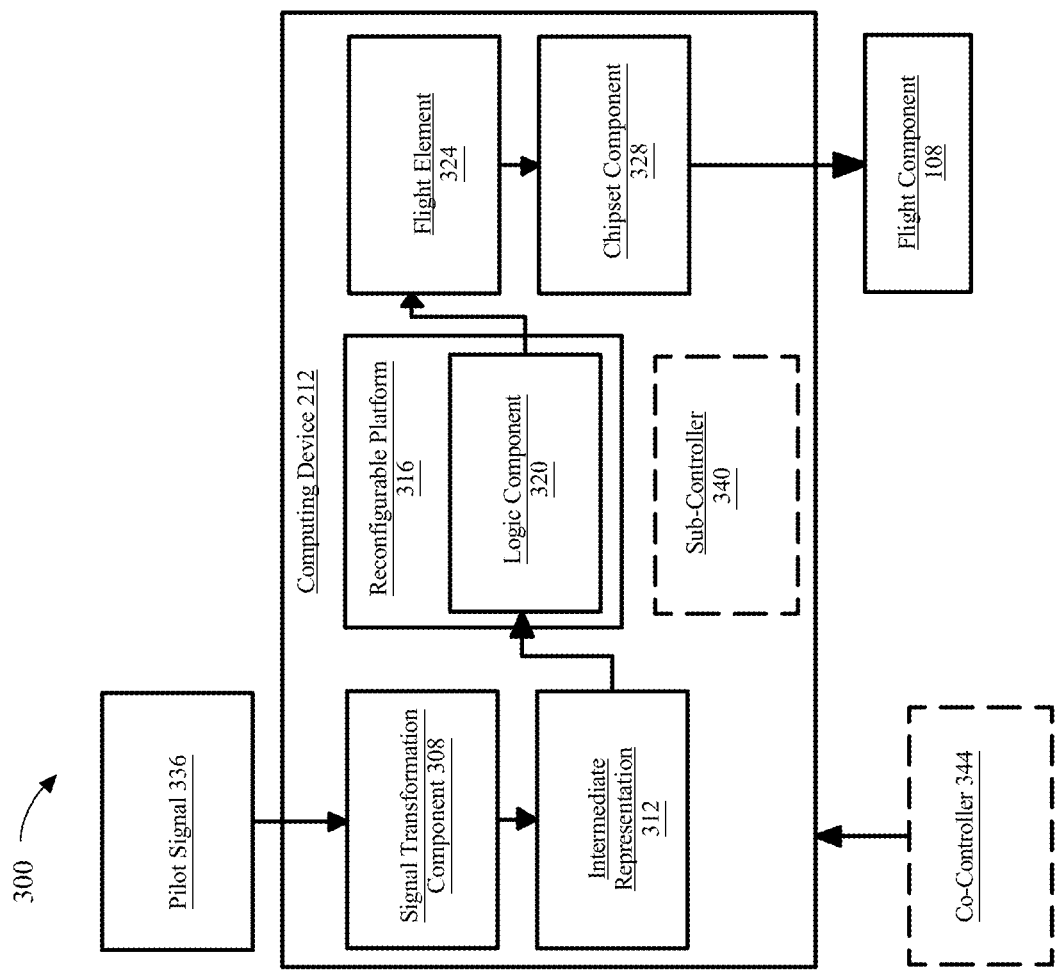
FIG. 3 is a block diagram of an exemplary embodiment of a flight controller.

Now referring to FIG. 3, an exemplary embodiment 300 of a possible computing device 112 is illustrated. Thus, a flight controller is illustrated. Flight controller may include and/or communicate with any computing device as described in this disclosure, including without limitation a microcontroller, microprocessor, digital signal processor (DSP) and/or system on a chip (SoC) as described in this disclosure. Further, flight controller may include a single computing device operating independently, or may include two or more computing device operating in concert, in parallel, sequentially or the like; two or more computing devices may be included together in a single computing device or in two or more computing devices. In embodiments, flight controller may be installed in an aircraft, may control aircraft 100 remotely, and/or may include an element installed in aircraft and a remote element in communication therewith.

In an embodiment, and still referring to FIG. 3, flight controller may include a signal transformation component 308. As used in this disclosure a "signal transformation component" is a component that transforms and/or converts a first signal to a second signal, wherein a signal may include one or more digital and/or analog signals. For example, and without limitation, signal transformation component 308 may be configured to perform one or more operations such as preprocessing, lexical analysis, parsing, semantic analysis, and the like thereof. In an embodiment, and without limitation, signal transformation component 308 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 308 may include transforming one or more low-level languages such as, but not limited to, machine languages and/or assembly languages. For example, and without limitation, signal transformation component 308 may include transforming a binary language signal to an assembly language signal. In an embodiment, and without limitation, signal transformation component 308 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 3, signal transformation component 308 may be configured to optimize an intermediate representation 312. As used in this disclosure an "intermediate representation" is a data structure and/or code that represents the input signal. Signal transformation component 308 may optimize intermediate representation as a function of a dataflow analysis, dependence analysis, alias analysis, pointer analysis, escape analysis, and the like thereof. In an embodiment, and without limitation, signal transformation component 308 may optimize intermediate representation 312 as a function of one or more inline expansions, dead code eliminations, constant propagation, loop transformations, and/or automatic parallelization functions. In another embodiment, signal transformation component 308 may optimize intermediate representation as a function of a machine dependent optimization such as a peephole optimization, wherein a peephole optimization may rewrite short sequences of code into more efficient sequences of code. Signal transformation component 308 may optimize intermediate representation to generate an output language, wherein an "output language," as used herein, is the native machine language of flight controller. For example, and without limitation, native machine language may include one or more binary and/or numerical languages.

In an embodiment, and without limitation, signal transformation component 308 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 3, flight controller may include a reconfigurable hardware platform 316. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 316 may be reconfigured to enact any algorithm and/or algorithm selection process received from another computing device and/or created using machine-learning processes.

Still referring to FIG. 3, reconfigurable hardware platform 316 may include a logic component 320. As used in this disclosure a "logic component" is a component that executes instructions on output language. For example, and without limitation, logic component may perform basic arithmetic, logic, controlling, input/output operations, and the like thereof. Logic component 320 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 320 may be organized according to Von Neumann and/or Harvard architecture as a non-limiting example. Logic component 320 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 320 may include one or more integrated circuit microprocessors, which may contain one or more central processing units, central processors, and/or main processors, on a single metal-oxide-semiconductor chip. Logic component 320 may be configured to execute a sequence of stored instructions to be performed on the output language and/or intermediate representation 312. Logic component 320 may be configured to fetch and/or retrieve the instruction from a memory cache, wherein a "memory cache," as used in this disclosure, is a stored instruction set on flight controller. Logic component 320 may be configured to decode the instruction retrieved from the memory cache to opcodes and/or operands. Logic component 320 may be configured to execute the instruction on intermediate representation 312 and/or output language. For example, and without limitation, logic component 320 may be configured to execute an addition operation on intermediate representation 312 and/or output language.

In an embodiment, and without limitation, logic component 320 may be configured to calculate a flight element 324. As used in this disclosure a "flight element" is an element of datum denoting a relative status of aircraft. For example, and without limitation, flight element 324 may denote one or more torques, thrusts, airspeed velocities, forces, altitudes, groundspeed velocities, directions during flight, directions facing, forces, orientations, and the like thereof. For example, and without limitation, flight element 324 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 324 may denote that aircraft is following a flight path accurately and/or sufficiently.

Still referring to FIG. 3, flight controller may include a chipset component 328. As used in this disclosure a "chipset component" is a component that manages data flow. In an embodiment, and without limitation, chipset component 328 may include a northbridge data flow path, wherein the northbridge dataflow path may manage data flow from logic component 320 to a high-speed device and/or component, such as a RAM, graphics controller, and the like thereof. In another embodiment, and without limitation, chipset component 328 may include a southbridge data flow path, wherein the southbridge dataflow path may manage data flow from logic component 320 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 328 may manage data flow between logic component 320, memory cache, and a flight component 108. As used in this disclosure a "flight component" is a portion of an aircraft that can be moved or adjusted to affect one or more flight elements. For example, flight component 108 may include a component used to affect the aircrafts' roll and pitch which may comprise one or more ailerons. As a further example, flight component 108 may include a rudder to control yaw of an aircraft. In an embodiment, chipset component 328 may be configured to communicate with a plurality of flight components as a function of flight element 324. For example, and without limitation, chipset component 328 may transmit to an aircraft rotor to reduce torque of a first lift propulsor and increase the forward thrust produced by a pusher component to perform a flight maneuver.

In an embodiment, and still referring to FIG. 3, flight controller is configured to produce both autonomous and semi-autonomous flight. As used in this disclosure an "autonomous function" is a mode and/or function of flight controller that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 324. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller will control the ailerons and/or rudders. As used in this disclosure "non-autonomous mode" is a mode that denotes a pilot will control aircraft and/or maneuvers of aircraft in its entirety.

In an embodiment, and still referring to FIG. 3, flight controller may generate autonomous function as a function of an autonomous machine-learning model. As used in this disclosure an "autonomous machine-learning model" is a machine-learning model to produce an autonomous function output given flight element 324 and a pilot signal 336 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 336 may denote that a pilot is controlling and/or maneuvering ailerons, wherein the pilot is not in control of the rudders and/or propulsors. In an embodiment, pilot signal 336 may include an implicit signal and/or an explicit signal. For example, and without limitation, pilot signal 336 may include an explicit signal, wherein the pilot explicitly states there is a lack of control and/or desire for autonomous function. As a further non-limiting example, pilot signal 336 may include an explicit signal directing flight controller to control and/or maintain a portion of aircraft, a portion of the flight plan, the entire aircraft, and/or the entire flight plan. As a further non-limiting example, pilot signal 336 may include an implicit signal, wherein flight controller detects a lack of control such as by a malfunction, torque alteration, flight path deviation, and the like thereof. In an embodiment, and without limitation, pilot signal 336 may include one or more explicit signals to reduce torque, and/or one or more implicit signals that torque may be reduced due to reduction of airspeed velocity. In an embodiment, and without limitation, pilot signal 336 may include one or more local and/or global signals. For example, and without limitation, pilot signal 336 may include a local signal that is transmitted by a pilot and/or crew member. As a further non-limiting example, pilot signal 336 may include a global signal that is transmitted by air traffic control and/or one or more remote users that are in communication with the pilot of aircraft. In an embodiment, pilot signal 336 may be received as a function of a tri-state bus and/or multiplexor that denotes an explicit pilot signal should be transmitted prior to any implicit or global pilot signal.

Still referring to FIG. 3, autonomous machine-learning model may include one or more autonomous machine-learning processes such as supervised, unsupervised, or reinforcement machine-learning processes that flight controller and/or a remote device may or may not use in the generation of autonomous function. As used in this disclosure, "remote device" is an external device to flight controller. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elastic net regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 3, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 3, flight controller may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller. Remote device and/or FPGA may transmit a signal, bit, datum, or parameter to flight controller that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 3, flight controller may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 3, flight controller may include, but is not limited to, for example, a cluster of flight controllers in a first location and a second flight controller or cluster of flight controllers in a second location. Flight controller may include one or more flight controllers dedicated to data storage, security, distribution of traffic for load balancing, and the like. Flight controller may be configured to distribute one or more computing tasks as described below across a plurality of flight controllers, which may operate in parallel, in series, redundantly, or in any other manner used for distribution of tasks or memory between computing devices. For example, and without limitation, flight controller may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 3, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 108. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 3, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 312 and/or output language from logic component 320, wherein output language may include one or more analog-to-digital conversions, low bit rate transmissions, message encryptions, digital signals, binary signals, logic signals, analog signals, and the like thereof described above in detail.

Still referring to FIG. 3, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 3, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 3, flight controller may also be implemented using a "shared nothing" architecture in which data is cached at the worker, in an embodiment, this may enable scalability of aircraft and/or computing device. Flight controller may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 3, flight controller may include a sub-controller 340. As used in this disclosure a "sub-controller" is a controller and/or component that is part of a distributed controller as described above; for instance, flight controller may be and/or include a distributed flight controller made up of one or more sub-controllers. For example, and without limitation, sub-controller 340 may include any controllers and/or components thereof that are similar to distributed flight controller and/or flight controller as described above. Sub-controller 340 may include any component of any flight controller as described above. Sub-controller 340 may be implemented in any manner suitable for implementation of a flight controller as described above. As a further non-limiting example, sub-controller 340 may include one or more processors, logic components and/or computing devices capable of receiving, processing, and/or transmitting data across the distributed flight controller as described above. As a further non-limiting example, sub-controller 340 may include a controller that receives a signal from a first flight controller and/or first distributed flight controller component and transmits the signal to a plurality of additional sub-controllers and/or flight components.

Still referring to FIG. 3, flight controller may include a co-controller 344. As used in this disclosure a "co-controller" is a controller and/or component that joins flight controller as components and/or nodes of a distributer flight controller as described above. For example, and without limitation, co-controller 344 may include one or more controllers and/or components that are similar to flight controller. As a further non-limiting example, co-controller 344 may include any controller and/or component that joins flight controller to distributer flight controller. As a further non-limiting example, co-controller 344 may include one or more processors, logic components and/or computing devices capable of receiving, processing, and/or transmitting data to and/or from flight controller to distributed flight control system. Co-controller 344 may include any component of any flight controller as described above. Co-controller 344 may be implemented in any manner suitable for implementation of a flight controller as described above.

In an embodiment, and with continued reference to FIG. 3, flight controller may be designed and/or configured to perform any method, method step, or sequence of method steps in any embodiment described in this disclosure, in any order and with any degree of repetition. For instance, flight controller may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
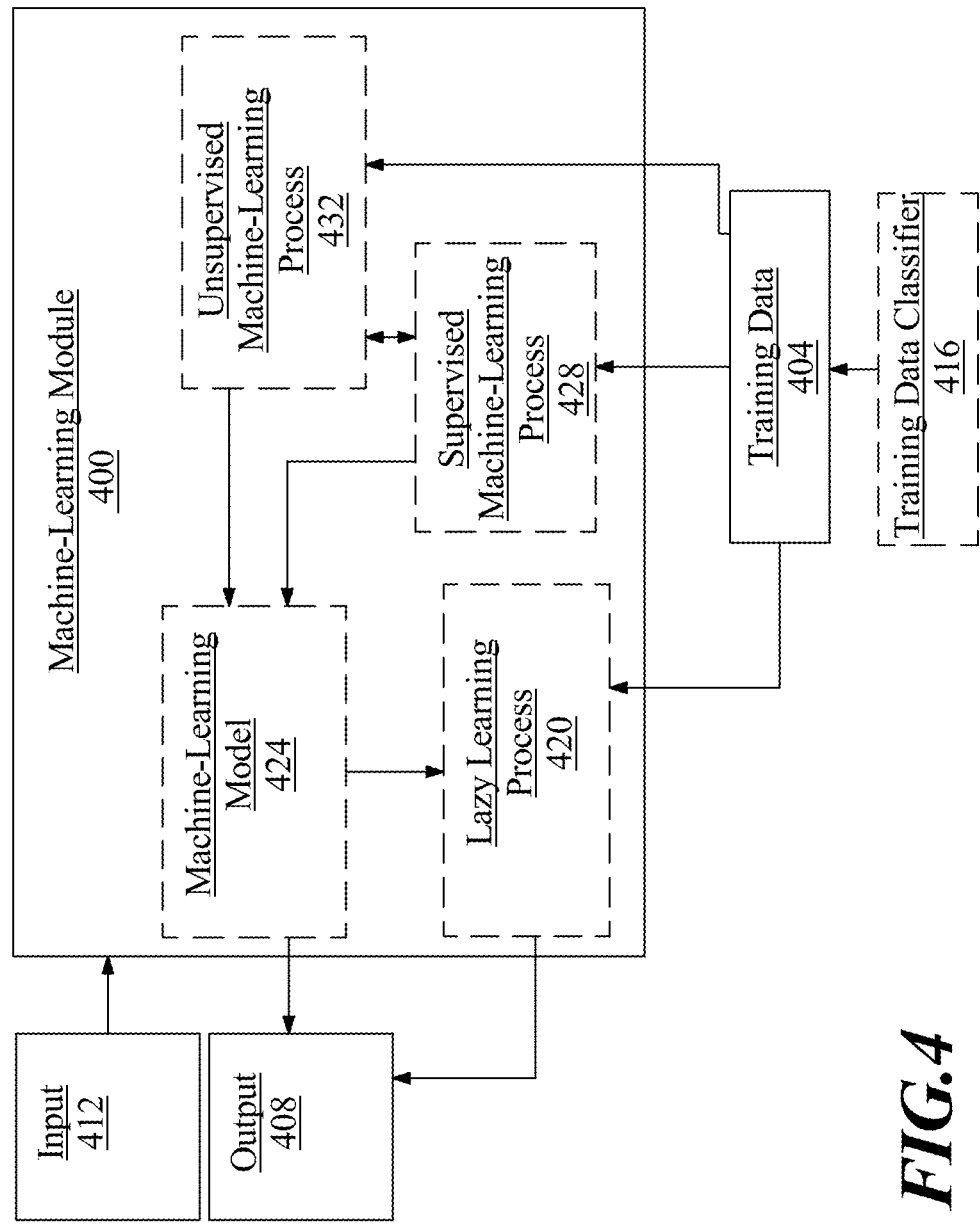
FIG. 4 is a block diagram of an exemplary embodiment of a machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example flight elements and/or pilot signals may be inputs, wherein an output may be an autonomous function.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
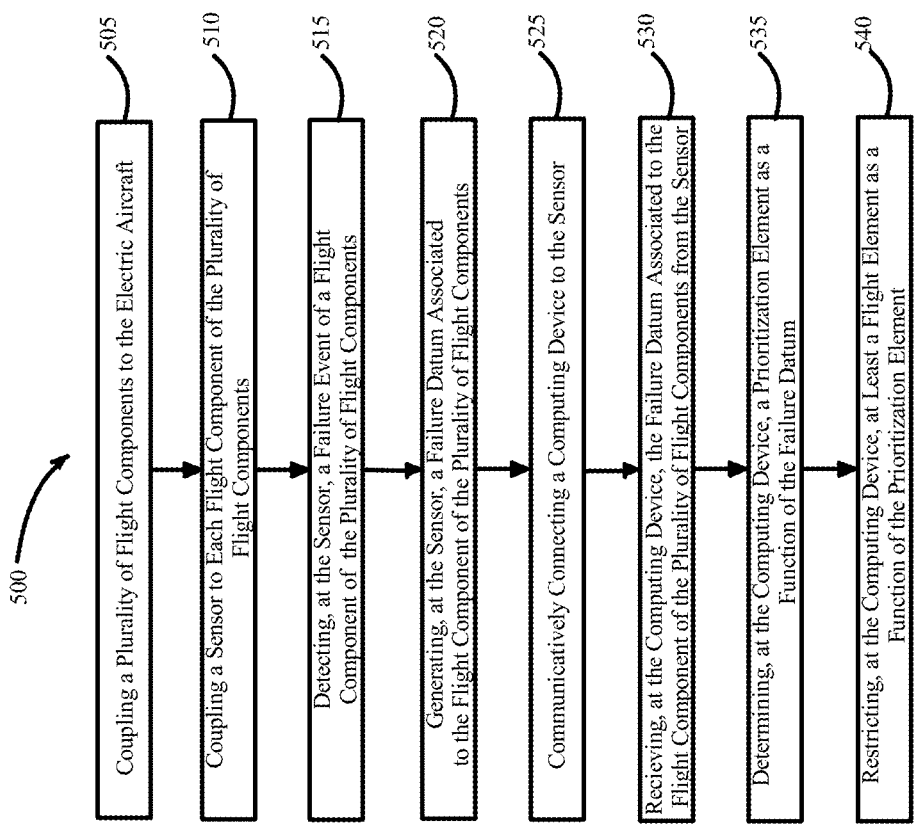
FIG. 5 is a flow diagram of an exemplary embodiment of a method for the prioritization of flight controls in an electric aircraft.

Now referring to FIG. 5, an exemplary embodiment of a method 500 for the prioritization of flight components in an electric aircraft. The electric aircraft may include, but without limitation, any of the aircraft as disclosed herein and described above with reference to at least FIG. 1.

Still referring to FIG. 5, at step 505, method 500 includes coupling a plurality of flight components 204 to the electric aircraft. Plurality of flight components further comprises a propulsor attached to each flight components of the plurality of flight components, including at least an actuator configured to move each propulsor. The plurality of flight components may include, but without limitation, any of the flight components as disclosed herein and described above with reference to at least FIGS. 1-2. The electric aircraft may include, but without limitation, any of the aircraft as disclosed herein and described above with reference to at least FIG. 1.

Still referring to FIG. 5, at step 510, method 500 includes coupling a sensor 208 to each flight component of the plurality of flight components 204. The sensor may include, but without limitation, any of the sensors as disclosed herein and described above with reference to at least FIG. 2. The plurality of flight components may include, but without limitation, any of the flight components as disclosed herein and described above with reference to at least FIGS. 1-2.

Still referring to FIG. 5, at step 515, method 500 includes detecting, at the sensor 208, a failure event of a flight component of the plurality of flight components 204. Failure event includes any event that degrades one or more flight elements. The sensor may include, but without limitation, any of the sensors as disclosed herein and described above with reference to at least FIG. 2. The plurality of flight components may include, but without limitation, any of the flight components as disclosed herein and described above with reference to at least FIGS. 1-2.

Still referring to FIG. 5, at step 520, method 500 includes generating, at the sensor 208, a failure datum 216 associated to the flight component of the plurality of flight components 204. Failure datum may include an element of data describing the failure event of the flight component. Computing device further determines a corrective action for a flight component of the plurality of flight components as a function of the failure datum. Computing device is further configured to command the actuator to maneuver the flight component of the plurality of flight components as a function of the corrective action The sensor may include, but without limitation, any of the sensors as disclosed herein and described above with reference to at least FIG. 2. The failure datum may include, but without limitation, any of the failure datums as disclosed herein and described above with reference to at least FIG. 2. The plurality of flight components may include, but without limitation, any of the flight components as disclosed herein and described above with reference to at least FIGS. 1-2.

Still referring to FIG. 5, at step 525, method 500 includes communicatively connecting a computing device 212 to the sensor 208. The computing device may include, but without limitation, any of the computing devices as disclosed herein and described above with reference to at least FIG. 2. The sensor may include, but without limitation, any of the sensors as disclosed herein and described above with reference to at least FIG. 2.

Still referring to FIG. 5, at step 530, method 500 includes receiving, at the computing device 212, the failure datum 216 associated to the flight component of the plurality of flight component 204 from the sensor 208. The computing device may include, but without limitation, any of the computing devices as disclosed herein and described above with reference to at least FIG. 2. The failure datum may include, but without limitation, any of the failure datums as disclosed herein and described above with reference to at least FIG. 2. The plurality of flight components may include, but without limitation, any of the flight components as disclosed herein and described above with reference to at least FIGS. 1-2. The sensor may include, but without limitation, any of the sensors as disclosed herein and described above with reference to at least FIG. 2.

Still referring to FIG. 5, at step 535, method 500 includes determining, at the computing device 212, a prioritization element 220 as a function of the failure datum 216. Prioritization element includes ranking one or more flight elements. Ranking may be performed as a function of a ranking-machine-learning process. The computing device may include, but without limitation, any of the computing devices as disclosed herein and described above with reference to at least FIG. 2. The prioritization element may include, but without limitation, any of the prioritization elements as disclosed herein and described above with reference to at least FIG. 2. The failure datum may include, but without limitation, any of the failure datums as disclosed herein and described above with reference to at least FIG. 2.

Still referring to FIG. 5, at step 540, method 500 includes restricting, at the computing device 212, at least a flight element as a function of the prioritization element 220. Restricting a flight element includes restricting a pilot's capability to maneuver it. The computing device may include, but without limitation, any of the computing devices as disclosed herein and described above with reference to at least FIG. 2. The prioritization element may include, but without limitation, any of the prioritization elements as disclosed herein and described above with reference to at least FIG. 2.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
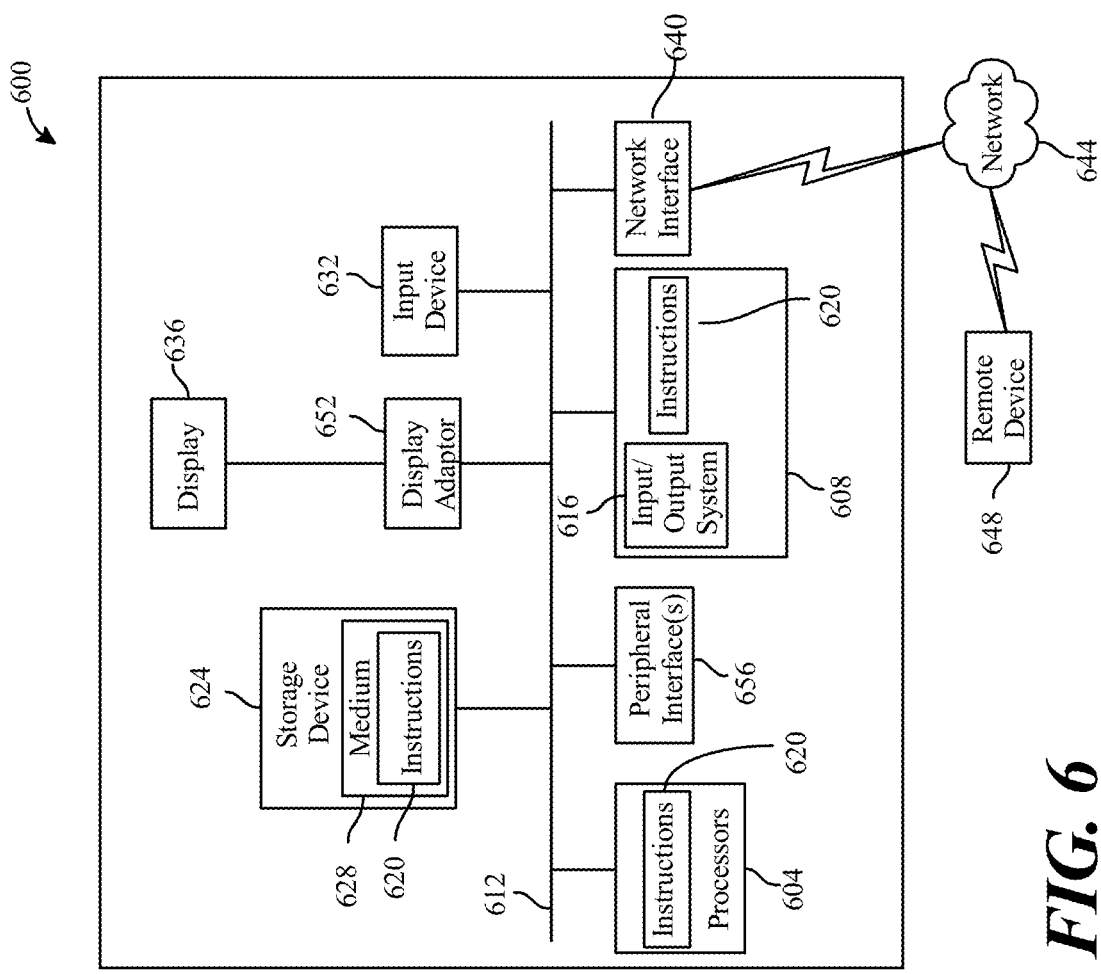
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

Figure 7:
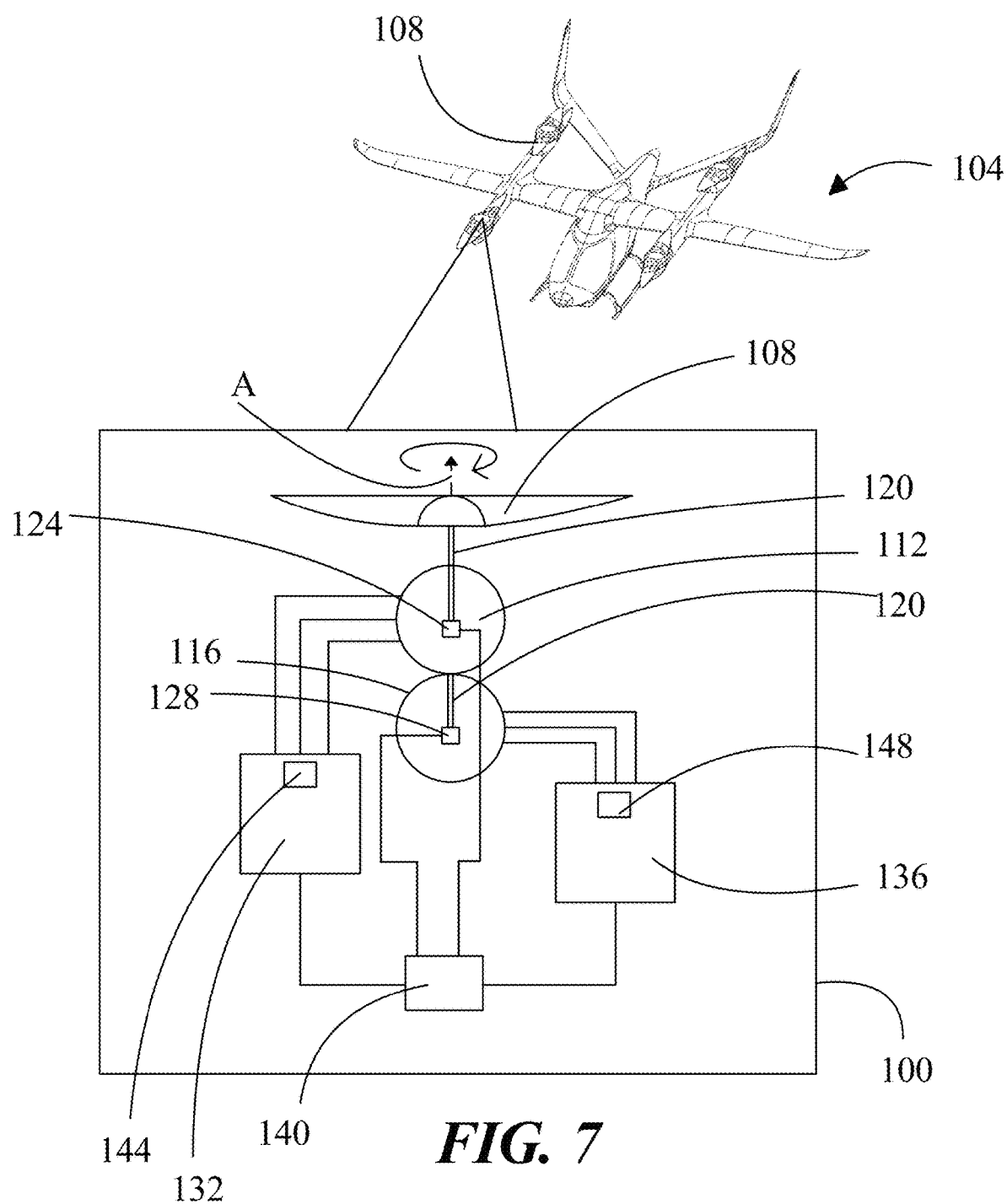
FIG. 7 is a block diagram of an exemplary embodiment of a propulsion system of an electric aircraft in accordance with one or more embodiments of the present disclosure.

Referring now to the drawings, FIG. 7 illustrates an exemplary embodiment of a dual-motor propulsion assembly 700 of an electric aircraft 704 in accordance with one or more embodiments of the present disclosure. In one or more embodiments of the present disclosure, dual-motor propulsion assembly 700 includes a flight component, such as propulsor 708. As used in this disclosure, a "flight component" is a portion of an electric aircraft that can be used to maneuver and/or move an electric aircraft through a fluid medium, such as a propulsor 708. For the purposes of this disclosure, a "propulsor" is a component or device used to propel a craft by exerting force on a fluid medium, which may include a gaseous medium such as air or a liquid medium such as water. Propulsor 708 may include any device or component that consumes electrical power on demand to propel an electric aircraft in a direction while on ground or in-flight. For example, and without limitation, propulsor may include a rotor, propeller, paddle wheel, and the like thereof. In an embodiment, propulsor may include a plurality of blades that radially extend from a hub of the propulsor so that the blades may convert a rotary motion from a motor into a swirling slipstream. In an embodiment, blade may convert rotary motion to push an aircraft forward or backward. For instance, and without limitation, propulsor 708 may include an assembly including a rotating power-driven hub, to which several radially-extending airfoil-section blades are fixedly attached thereto, where the whole assembly rotates about a central longitudinal axis A. The blade pitch of a propeller may, for example, be fixed, manually variable to a few set positions, automatically variable (e.g., a "constant-speed" type), or any combination thereof. In an exemplary embodiment, propellers for an aircraft may be designed to be fixed to their hub at an angle similar to the thread on a screw makes an angle to the shaft; this angle may be referred to as a pitch or pitch angle which will determine the speed of the forward movement as the blade rotates. In one or more exemplary embodiments, propulsor 708 may include a vertical propulsor or a forward propulsor. A forward propulsor may include a propulsor configured to propel aircraft 704 in a forward direction. A vertical propulsor may include a propulsor configured to propel aircraft 704 in an upward direction. One of ordinary skill in the art would understand upward to comprise the imaginary axis protruding from the earth at a normal angle, configured to be normal to any tangent plane to a point on a sphere (i.e. skyward). In an embodiment, vertical propulsor can be a propulsor that generates a substantially downward thrust, tending to propel an aircraft in an opposite, vertical direction and provides thrust for maneuvers. Such maneuvers can include, without limitation, vertical take-off, vertical landing, hovering, and/or rotor-based flight such as "quadcopter" or similar styles of flight.

In one or more embodiments, propulsor 708 can include a thrust element which may be integrated into the propulsor. The thrust element may include, without limitation, a device using moving or rotating foils, such as one or more rotors, an airscrew, or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like. In one or more embodiments, propulsor 708 may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1145 N to force electric aircraft 704 in a horizontal direction along a longitudinal axis of electric aircraft 704. As a further non-limiting example, pusher component may twist and/or rotate to pull air behind it and, at the same time, push electric aircraft 704 forward with an equal amount of force. In an embodiment, and without limitation, the more air forced behind aircraft, the greater the thrust force with which electric aircraft 704 is pushed horizontally will be. In another embodiment, and without limitation, forward thrust may force electric aircraft 704 through the medium of relative air. Additionally or alternatively, plurality of propulsor may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

In one or more embodiments, dual-motor propulsion assembly 700 includes a plurality of motors, which includes a first motor 712 and a second motor 716 (also referred to herein in the singular as "motor" or plural as "motors"). Each motor 712,716 is mechanically connected to a flight component, such as propulsor 708, of electric aircraft 704. Motors 712,716 are each configured to convert an electrical energy and/or signal into a mechanical movement of a flight component, such as, for example, by rotating a shaft attached to propulsor 708 that subsequently rotates propulsor 708 about a longitudinal axis A of shaft. In one or more embodiments, motors 712,716 may be driven by direct current (DC) electric power. For instance, and without limitation, a motor may include a brushed DC motor or the like. In one or more embodiments, motors 712,716 may be a brushless DC electric motor, a permanent magnet synchronous motor, a switched reluctance motor, and/or an induction motor. In other embodiments, motors 712,716 may be driven by electric power having varying or reversing voltage levels, such as alternating current (AC) power as produced by an alternating current generator and/or inverter, or otherwise varying power, such as produced by a switching power source. Persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers (not shown) or other components for regulating motor speed, rotation direction, torque, and/or dynamic braking.

In one or more embodiments, each motor 712,716 may include a rotor coaxial disposed within a stator. As understood a rotor is a portion of an electric motor that rotates with respect to a stator, which remains stationary relative to a corresponding electric aircraft. In one or more embodiments, assembly 700 includes a shaft that extends through each motor 712,716. Motors 712,716 may be arranged such that one motor may be stacked atop the other motor. For example, and without limitation, first motor 712 and second motor 716 may share an axis, such as, for example, motors 712,716 may be coaxially positioned along longitudinal axis A of shaft 720 while first motor 712 may be positioned closer to a flight component than second motor 716 along longitudinal axis A. In one or more embodiments, assembly 700 may include a clutch. For example, and without limitation, each motor 712,716 may include a clutch 724,728, respectively, that engages or disengages shaft 720 upon receipt of an command from a controller, as discussed further in this disclosure. Each clutch 724,728 may include an electro-mechanical clutch. In one or more embodiments, clutches 724, 728 are configured to engage or disengage a power transmission to each motor 712,716, respectively. In one or more embodiments, a clutch may include a sprag clutch, electromagnetic clutch, a sacrificial weak component to break at a threshold torque, one-time breakaway clutch, such as a sheering element that would break free at a designated torque, and/or any other clutch component.

Still referring to FIG. 7, assembly 700 includes a sensor configured to detect a motor characteristic of motors 712, 716. In one or more embodiments, a sensor may include a first sensor 732 communicatively connected to first motor 712, and a second sensor 736 communicatively connected to second motor 716. As used in this disclosure, a "sensor" is a device that is configured to detect an event and/or a phenomenon and transmit information and/or datum related to the detection. For instance, and without limitation, a sensor may transform an electrical and/or physical stimulation into an electrical signal that is suitable to be processed by an electrical circuit, such as controller 740. A sensor may generate a sensor output signal, which transmits information and/or datum related to a detection by the sensor. A sensor output signal may include any signal form described in this disclosure, for example digital, analog, optical, electrical, fluidic, and the like. In some cases, a sensor, a circuit, and/or a controller may perform one or more signal processing steps on a signal. For instance, a sensor, circuit, and/or controller may analyze, modify, and/or synthesize a signal in order to improve the signal, for instance by improving transmission, storage efficiency, or signal to noise ratio.

In one or more embodiments, each motor 712,716 may include or be connected to one or more sensors detecting one or more conditions and/or characteristics of motors 712,716. One or more conditions may include, without limitation, voltage levels, electromotive force, current levels, temperature, current speed of rotation, position sensors, torque, and the like. For instance, and without limitation, one or more sensors may be used to detect torque, or to detect parameters used to determine torque, as described in further detail below. One or more sensors may include a plurality of current sensors, voltage sensors, speed or position feedback sensors, such as encoders, and the like. A sensor may communicate a current status of motor to a person operating system or a computing device; computing device may include any computing device as described below, including without limitation, a controller, a processor, a microprocessor, a control circuit, a flight controller, or the like. In one or more embodiments, computing device may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described herein.

In one or more embodiments, each sensor 732,736 may detect a motor characteristic, such as position, displacement, and/or speed, of a component of each motor 712,716, respectively. For the purposes of this disclosure, a "motor characteristic" is a physical or electrical phenomenon associated with an operation and/or condition of a motor. In one or more embodiments, a sensor of assembly 700 may generate a failure datum as a function of a motor characteristic and transmit the failure datum to a controller. For example, and without limitation, each sensor 732,736 may transmit an output signal that, for example, includes failure datum to a controller, as discussed further in this disclosure. For the purposes of this disclosure, "failure datum" is an electrical signal representing information related to a motor characteristic of a motor and/or components thereof that indicates a motor malfunction or failure, such as inoperativeness of a motor.

In one or more embodiments, each sensor 732,736 may include a plurality of sensors in the form of individual sensors or a sensor suite working in tandem or individually. A sensor suite may include a sensor array having a plurality of independent sensors, where any number of the described sensors may be used to detect any number of physical or electrical quantities associated with an electric vehicle. For example, sensor suite may include a plurality of sensors where each sensor detects the same physical phenomenon. Independent sensors may include separate sensors measuring physical or electrical quantities that may be powered by and/or in communication with circuits independently, where each may signal sensor output to a control circuit such as a user graphical interface. In a non-limiting example, there may be a plurality of sensors housed in and/or on electric vehicle and/or components thereof, such as battery pack of electric aircraft, measuring temperature, electrical characteristic such as voltage, amperage, resistance, or impedance, or any other parameters and/or quantities as described in this disclosure. In one or more embodiments, use of a plurality of independent sensors may also result in redundancy configured to employ more than one sensor that measures the same phenomenon, those sensors being of the same type, a combination of, or another type of sensor not disclosed, to detect a specific characteristic and/or phenomenon.

In one or more embodiments, each sensor 732,736 may include an electrical sensor. An electrical sensor may be configured to measure a voltage across a component, electrical current through a component, and resistance of a component. In one or more non-limiting embodiments, an electrical sensor may include a voltmeter, ammeter, ohmmeter, and the like. For example, and without limitation, an electrical sensor may measure power from a power source of an electric aircraft being provided to a motor.

In one or more embodiments, each sensor 732,736 may include a temperature sensor. In one or more embodiments, a temperature sensor may include thermocouples, thermistors, thermometers, infrared sensors, resistance temperature sensors (RTDs), semiconductor based integrated circuits (IC), and the like. "Temperature", for the purposes of this disclosure, and as would be appreciated by someone of ordinary skill in the art, is a measure of the heat energy of a system. Temperature, as measured by any number or combinations of sensors present, may be measured in Fahrenheit (° F.), Celsius (° C.), Kelvin (° K), or another scale alone, or in combination.

Still referring to FIG. 7, each sensor 732,736 may include a motion sensor. A motion sensor refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. A motion sensor may include, torque sensor, gyroscope, accelerometer, position, sensor, magnetometer, inertial measurement unit (IMU), pressure sensor, force sensor, proximity sensor, displacement sensor, vibration sensor, or the like.

In one or more embodiments, each sensor 732,736 may include various other types of sensors configured to detect a physical phenomenon of each motor 712,716, respectively. For instance, each sensor 732,736 may include photoelectric sensors, radiation sensors, infrared sensors, and the like. Each sensor 732,736 may include contact sensors, non-contact sensors, or a combination thereof. In one or more embodiments, each sensor 732,736 may include digital sensors, analog sensors, or a combination thereof. Each sensor 732,736 may include digital-to-analog converters (DAC), analog-to-digital converters (ADC, A/D, A-to-D), a combination thereof, or other signal conditioning components used in transmission of measurement data to a destination, such as controller 740, over a wireless and/or wired connection.

In one or more embodiments, each sensor 732,736 may include an encoder. In one or more embodiments, first motor 712 may include a first encoder 744, and second motor 716 may include a second encoder 748. In one or more embodiments, each encoder 744,748 may be configured to detect a rotation angle of a motor, where the encoder converts an angular position and/or motion of a shaft of each motor 712,716, respectively, to an analog and/or digital output signal. In some cases, for example, each encoder 744,748 may include a rotational encoder and/or rotary encoder that is configured to sense a rotational position of a pilot control, such as a throttle level, and/or motor component; in this case, the rotational encoder digitally may sense rotational "clicks" by any known method, such as without limitation magnetically, optically, and the like. In one or more embodiments, encoders 744,748 may include a mechanical encoder, optical encoder, on-axis magnetic encoder, and/or an off-axis magnetic encoder. In one or more embodiments, an encoder includes an absolute encoder or an incremental encoder. For example, and without limitation, encoders 744,748 may include an absolute encoder, which continues to monitor position information related to corresponding motors 712,716 even when encoders 744,748 are no longer receiving power from, for example, a power source of electric aircraft 704. Once power is returned to encoders 744,748, encoders 744,748 may provide the detected position information to a controller. In another example, and without limitation, encoder 744,748 may include an incremental encoder, where changes in position of motor are monitored and immediately reported by the encoders 744, 748. In one or more embodiments, encoders 744,748 may include a closed feedback loop or an open feedback loop. In one or more exemplary embodiments, an encoder is configured to determine a motion of a motor, such as a speed in revolutions per minute of the motor. An encoder may be configured to transmit an output signal, which includes feedback, to a controller and/or motor; as a result, the motor may operate based on the received feedback from the encoder. For example, and without limitation, a clutch of a motor may engage a shaft of assembly 700 if the motor is determined to be operational based on feedback from a corresponding encoder. However, if a motor is determined to be inoperative based on feedback from a corresponding encoder, then a clutch of the motor may be disengaged form the shaft so that the other motor may engage the shaft and provide motive power to the flight component attached to the shaft.

Still referring to FIG. 7, dual-motor propulsion assembly 700 includes a controller 740. In one or more embodiments, controller 740 is communicatively connected to the plurality of motors. In one or more embodiments, controller 740 is communicatively connected to each motor 712,716. In one or more embodiments, controller 740 may be communicatively connected to a sensor. For instance, and without limitation, controller 740 may be communicatively connected to each sensor 732,736. In other embodiments, controller 740 may be communicatively connected to each clutch 724,728. For the purposes of this disclosure, "communicatively connected" is a process whereby one device, component, or circuit is able to receive data from and/or transmit data to another device, component, or circuit. A communicative connection may be performed by wired or wireless electronic communication; either directly or by way of one or more intervening devices or components. In an embodiment, a communicative connection includes electrically connecting an output of one device, component, or circuit to an input of another device, component, or circuit. Communicative connection may be performed via a bus or other facility for intercommunication between elements of a computing device. Communicative connection may include indirect connections via "wireless" connection, low power wide area network, radio communication, optical communication, magnetic, capacitive, or optical coupling, or the like. In one or more embodiments, a communicative connection may be wireless and/or wired. For example, controller 740 may communicative with sensors 732,736 and/or clutches via a controller area network (CAN) communication.

In one or more embodiments, controller 740 may include a flight controller (shown in FIG. 4), computing device (shown in FIG. 5), a central processing unit (CPU), a microprocessor, a digital signal processor (DSP), an application specific integrated circuit (ASIC), a control circuit, a combination thereof, or the like. In one or more embodiments, output signals, such as motor datum, from sensors 732,736 and/or controller 740 may be analog or digital. Controller 740 may convert output signals from a sensor to a usable form by the destination of those signals. The usable form of output signals from sensors 732,736 and through controller 740 may be either digital, analog, a combination thereof, or an otherwise unstated form. Processing by controller 740 may be configured to trim, offset, or otherwise compensate the outputs of sensors. Based on output of the sensors, controller 740 may determine the output to send to a downstream component. Controller 740 may perform signal amplification, operational amplifier (Op-Amp), filter, digital/analog conversion, linearization circuit, current-voltage change circuits, resistance change circuits such as Wheatstone Bridge, an error compensator circuit, a combination thereof or otherwise undisclosed components.

In one or more embodiments, controller 740 may include a timer that works in conjunction to determine regular intervals. In other embodiments, controller 740 may continuously update datum provided by sensors 732,736. Furthermore, data from sensors 732,736 may be continuously stored on a memory component of controller 740. A timer may include a timing circuit, internal clock, or other circuit, component, or part configured to keep track of elapsed time and/or time of day. For example, in non-limiting embodiments, a memory component may save a critical event datum and/or condition datum from sensors 732,736, such as failure datum, every 30 seconds, every minute, every 30 minutes, or another time period according to a timer.

Controller 740 may be designed and/or configured to perform any method, method step, or sequence of method steps in any embodiment described in this disclosure, in any order and with any degree of repetition. For instance, controller 740 may be configured to perform a single step or sequence repeatedly until a desired or commanded outcome is achieved. Repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 740 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Controller 740, as well as any other components or combination of components, may be connected to a controller area network (CAN), which may interconnect all components for signal transmission and reception.

In one or more embodiments, controller 740 may receive a transmitted output signal, such as failure datum, from sensors 732,736. For example, and without limitation, first sensor 732 may detect that first motor 712 has received a pilot command from a pilot via a pilot control of electric aircraft 704, such as a throttle actuation indicating a desired motor speed increase. First sensor 732 may then detect a motor characteristic of first motor 712. Subsequently, first encoder 744 may transmit failure datum to controller 740 if first sensor 732 detects that motor is inoperative, such as for example, if first motor 712 does not move in response to the pilot command. As a result, controller 740 may alert, for example, a pilot of the inoperativeness and transmit a signal to second motor to move the flight component. For example, second motor may engage shaft 720 and rotate shaft 720 about longitudinal axis A to provide motive power to propulsor 708 so that propulsor moves as intended by the pilot command of the pilot. Therefore, second motor 716 provides redundancy such that, if first motor 712 fails, propulsor 708 may remain operational as second motor 716 continues to move propulsor 708. System redundancies performed by controller 740 and/or motors 712,716 may include any systems for redundant flight control as described in U.S. Nonprovisional application Ser. No. 17/404,614, filed on Aug. 17, 2021, and entitled "SYSTEMS AND METHODS FOR REDUNDANT FLIGHT CONTROL IN AN AIRCRAFT," the entirety of which is incorporated herein by reference. Additional disclosure related to dual motor propulsors may be found in U.S. patent application Ser. No. 17/702,069 titled "DUAL-MOTOR PROPULSION ASSEMBLY," filed on Mar. 23, 2022, and incorporated herein by reference in its entirety.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for the prioritization of flight controls in an electric aircraft, the system comprising:
   a plurality of flight components coupled to the electric aircraft;
   a sensor coupled to each flight component of the plurality of flight components, wherein each sensor is configured to:
      detect a failure event of a flight component of the plurality of flight components; and
      generate a failure datum associated to the flight component of the plurality of flight components and
   a computing device communicatively connected to the sensor, wherein the computing device is configured to:
      receive the failure datum associated to the flight component of the plurality of flight components from the sensor;
      determine a prioritization element as a function of the failure datum associated with the failure event of the flight component of the plurality of flight components wherein determining the prioritization element further includes ranking at least a flight element with at least another flight elements;
      display, using a display device located within the electric aircraft, the failure datum and the prioritization element to a pilot within the electric aircraft;
      restrict at least a flight element as a function of the prioritization element, wherein restricting at least a flight element includes mitigating the pilot's capability of maneuvering the at least a flight element.

2. The system of claim 1, wherein the failure datum includes an element of data describing the failure event of the flight component.

3. The system of claim 1, wherein the prioritization element includes a ranking of three or more flight elements.

4. The system of claim 1, wherein the flight component includes a first motor of a dual-motor propulsor.

5. The system of claim 1, wherein a second highest priority is given to a flight element of heave, a third highest priority is given to a flight element of roll, and a fourth highest priority is given to flight element of pitch.

6. The system of claim 1, wherein restricting the at least a flight element includes restricting a pilot's capability of controlling the at least a flight element through a flight controller, and wherein the at least a flight element includes yaw.

7. The system of claim 1, wherein the flight component includes a battery.

8. The system of claim 1, further comprising a pilot control located within the electric aircraft and configured to generate a pilot signal as a function of interaction with the pilot.

9. The system of claim 8, wherein the computing device is further configured to receive the pilot signal; and
   restrict at least a flight element as a function of the pilot signal.

10. The system of claim 1, wherein a highest priority is given to a flight element of pitch, a second highest priority is given to a flight element of heave, a third highest priority is given to a flight element of roll, and a fourth highest priority is given to flight element of yaw.

11. The system of claim 1, wherein the flight component includes a first motor of a dual-motor propulsor.

12. A method for the prioritization of flight controls in an electric aircraft, the method comprising:
- coupling a plurality of flight components to the electric aircraft;
- coupling a sensor to each flight component of the plurality of flight components;
- detecting, at the sensor, a failure event of a flight component of the plurality of flight components;
- generating, at the sensor, a failure datum associated to the flight component of the plurality of flight components; and
- communicatively connecting a computing device to the sensor;
- receiving, at the computing device, the failure datum associated to the flight component of the plurality of flight components from the sensor;
- determining, at the computing device, a prioritization element as a function of the failure datum associated with the failure event of the flight component of the plurality of flight components, wherein determining the prioritization element further includes ranking at least a flight element of yaw with at least another flight elements;
- displaying, using a display device located within the electric aircraft and the computing device, the failure datum and the prioritization element to a pilot within the electric aircraft;
- restricting, at the computing device, at least a flight element as a function of the prioritization element, wherein restricting at least a flight element includes mitigating the pilot's capability of maneuvering the at least a flight element.

13. The method of claim 12, wherein the failure datum includes an element of data describing the failure event of the flight component.

14. The method of claim 12, wherein the prioritization element includes a ranking of three or more flight elements.

15. The method of claim 12, wherein a second highest priority is given to a flight element of heave, a third highest priority is given to a flight element of roll, and a fourth highest priority is given to flight element of pitch.

16. The method of claim 12, wherein restricting the at least a flight element includes restricting a pilot's capability of controlling the at least a flight element through a flight controller and wherein the at least a flight element includes yaw.

17. The method of claim 12, wherein the flight component includes a battery.

18. The method of claim 12, further comprising, generating, using a pilot control located within the electric aircraft, a pilot signal as a function of interaction with the pilot.

19. The method of claim 12, further comprising:
- receiving, at the computing device, the pilot signal; and
- restricting, at the computing device, at least a flight element as a function of the pilot signal.

20. The method of claim 12, wherein a highest priority is given to a flight element of pitch, a second highest priority is given to a flight element of heave, a third highest priority is given to a flight element of roll, and a fourth highest priority is given to flight element of yaw.

* * * * *